Sept. 9, 1958　　　　H. H. OFFUTT　　　　2,850,855
BAG OVERSLIP MACHINE
Filed Aug. 22, 1956　　　　　　　　　　4 Sheets-Sheet 1
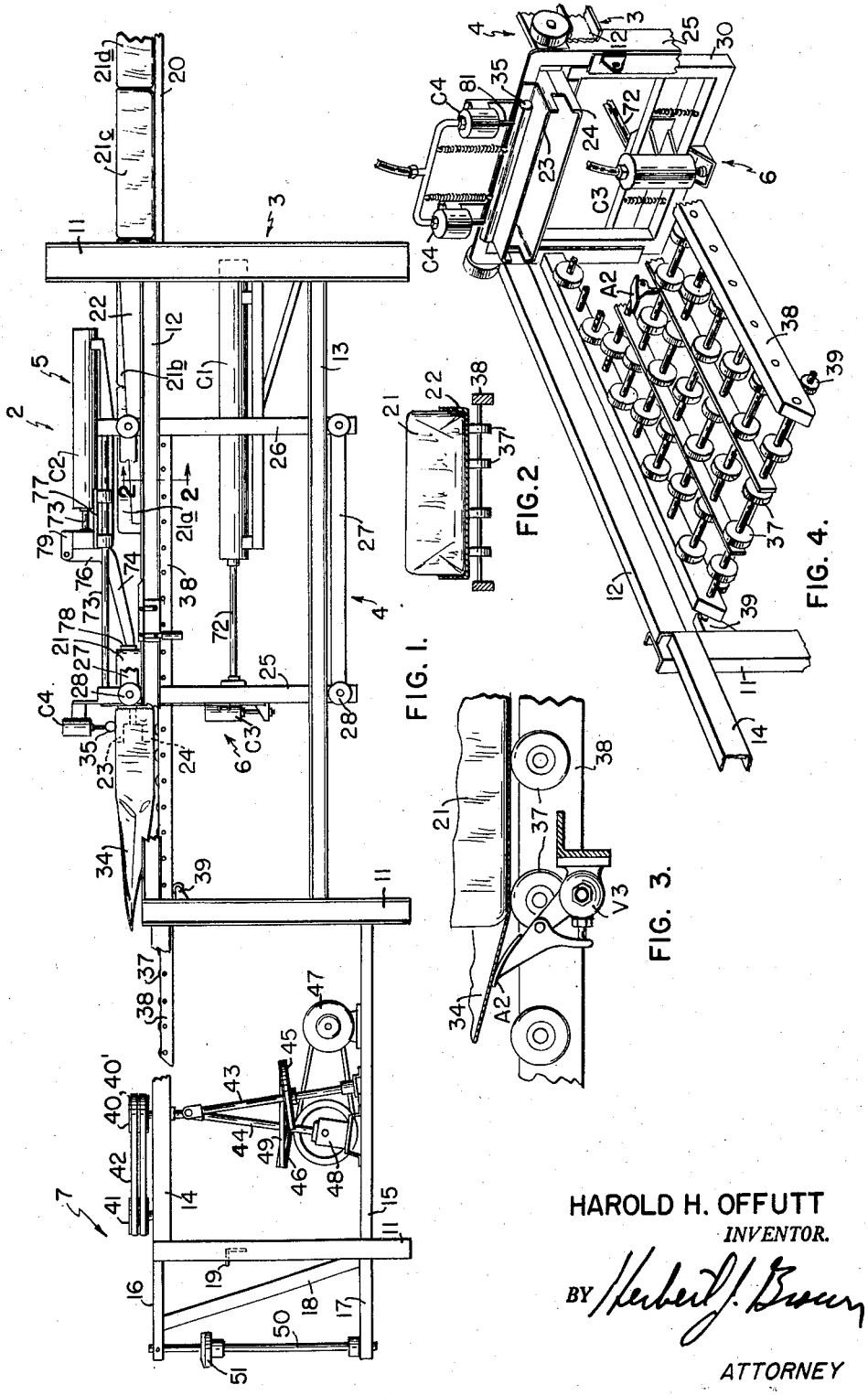
HAROLD H. OFFUTT
INVENTOR.
BY
ATTORNEY Sept. 9, 1958 H. H. OFFUTT 2,850,855
BAG OVERSLIP MACHINE Filed Aug. 22, 1956 4 Sheets-Sheet 2

HAROLD H. OFFUTT
*INVENTOR.*

BY *Herbert J. Brown*

*ATTORNEY*

Sept. 9, 1958  H. H. OFFUTT  2,850,855
BAG OVERSLIP MACHINE
Filed Aug. 22, 1956  4 Sheets-Sheet 3
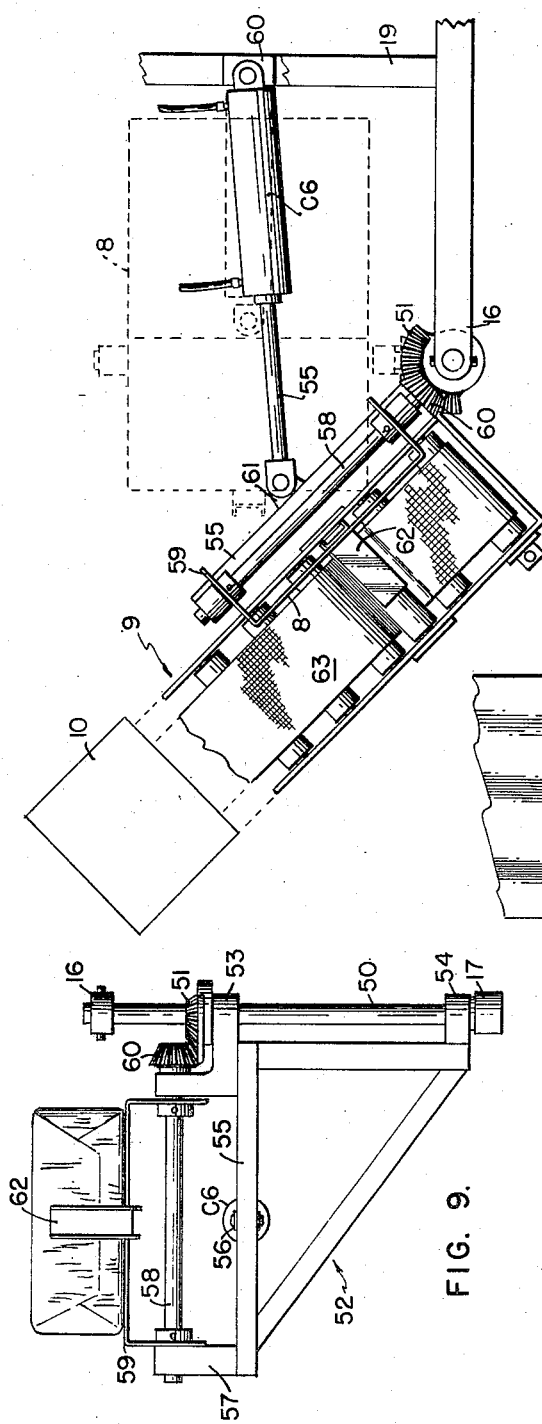
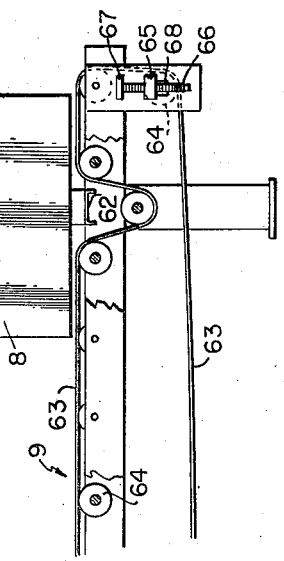
HAROLD H. OFFUTT
INVENTOR.
BY Herbert J. Brown
ATTORNEY Sept. 9, 1958 H. H. OFFUTT 2,850,855
BAG OVERSLIP MACHINE
Filed Aug. 22. 1956 4 Sheets-Sheet 4

HAROLD H. OFFUTT
INVENTOR.

BY
ATTORNEY

United States Patent Office 2,850,855
Patented Sept. 9, 1958

2,850,855

BAG OVERSLIP MACHINE

Harold H. Offutt, Odessa, Tex., assignor to Sid Richardson Carbon Company, Fort Worth, Tex., a corporation of Texas Application August 22, 1956, Serial No. 605,520

10 Claims. (Cl. 53—27)

This invention relates generally to package handling machinery and more specifically to a machine for repacking articles during a conveyor line delivery.

The primary object of this invention is to provide an efficient, easy to operate, overslipping (repackaging) machine which is installed in the output delivery line of a conventional compression or other packaging machine and in which the operation of the overslipping machine does not interrupt or delay the function of the delivery line.

Another object is to provide an overslipping machine which is installed in line with a conventional conveyor line and which permits the overslip, which is a heavy duty paper bag, to be applied to articles on the conveyor without interrupting or changing the direction of their straight line travel.

A still further object is to provide an overslipping machine of this type which is automatic in operation from the instant the operator places the empty overslip bag into the machine.

Another object is to provide an overslipping machine which can slip into operation between continuous articles on a conveyor line and perform its loading, packing and discharging operation on one article on the conveyor line without disturbing any subsequent articles.

A still further object is to provide an overslipping machine which includes a sliding skate wheel platform which passes under the conveyor line to permit passing an article to be packaged (overslipped) from the conveyor line to the overslip at one end and then pass the article in its overslip to a discharge mechanism.

An additional object is to provide an overslipping machine which includes a parallel jaw funnel and unique bag clamp whereby the overslip bag may be installed on the machine in a very expedient manner by one man without requiring any normal fastening and in a manner that will not tear or distort the bag.

And another object is to provide a method of installing an empty overslip bag over a filled package on a conveyor line by separating the leading package on the line, slipping an overslip bag thereon and discharging same without moving out of the straight line of travel of the conveyor and without changing the speed of the packages moving on the conveyor.

These and other objects and advantages will be apparent from an examination of the following specification and drawing in which:

Figure 1 represents a side elevational view of the overslipping machine of this invention.

Figure 2 is a cross sectional view taken along the lines 2—2 of Figure 1.

Figure 3 is a detail fragmentary cross section taken through an overslip in operation and showing the high speed carriage return valve at a position just prior to its being tripped.

Figure 4 is a fragmentary view of the carriage discharge end.

Figure 9 is an end view of the discharge bag ender mechanism of this invention in its first operational stage.

Figure 10 is a top plan view of the device of Figure 9 in its last operational stage.

Figure 11 is a side elevational fragmentary view of the device of Figure 10 with an overslipped package in an end-up position to be conveyed to a final sealing machine.

Figure 6:
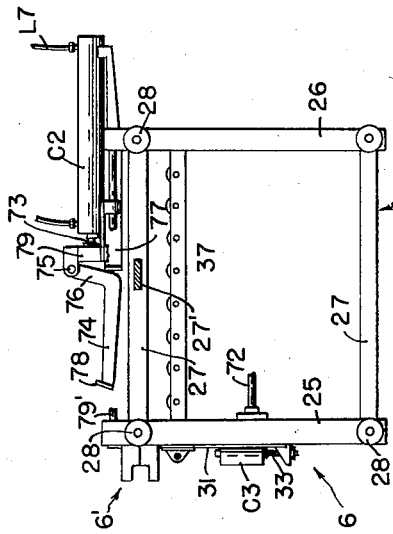
Figure 6 is a side elevational view of the traveling carriage of Figure 5 and showing the attached pusher assembly.
Figure 7:
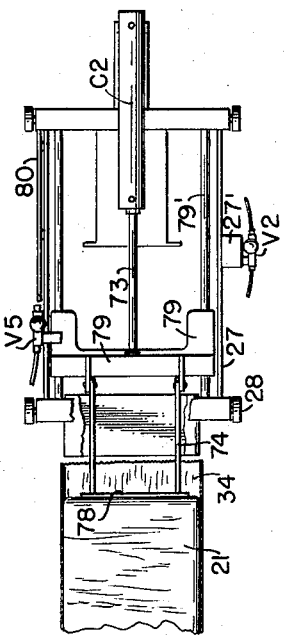
Figure 7 is a top plan view of the carriage of Figure 6 and in this view showing the pusher assembly in the operation of inserting a packaged article into an overslip.

Referring now more particularly to the characters of reference of the drawing, the bag overslipping machine of this invention, indicated generally at 2, is seen to consist basically of a frame 3 on which a carriage 4 travels longitudinally and carries a pusher assembly 5, a funnel and clamp assembly 6, and a discharge end mechanism 7 which discharges the overslipped package or bag 8 in an end up position onto conveyor 9 for delivery to a conventional sealing machine 10.

The frame 3 is made up of structural members rigidly fastened together to support the various moving mechanisms thereon. Spaced vertical supports 11 and horizontal frame members 12 and 13 are made from steel channel and beams 14 and 15 as well as 16 and 17 and strut 18 may be angles or box sections. Cross members 19 are placed as required to brace the main frame 3 and in such location as to avoid interference from carriage 4 during its travel cycle. The forwardmost of vertical supports 11 straddles a conventional discharge rack or conveyor 20 which contains packages 21 and leads directly into guide chute 22 which is in longitudinal alignment with funnel jaws 23 and 24 of funnel assembly 6.

Figure 5:
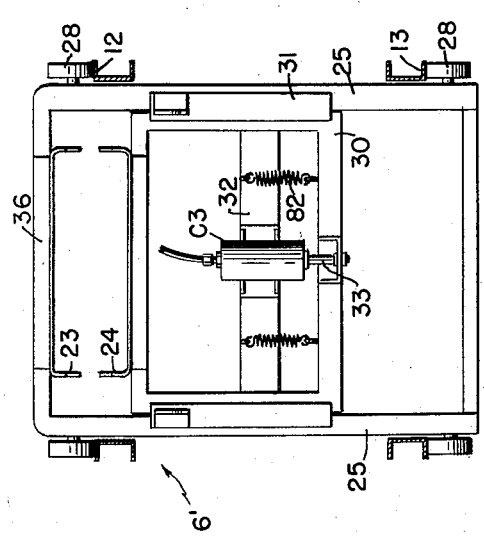
Figure 5 is an end view of the traveling carriage and funnel frame assembly of this machine.
Figure 8:
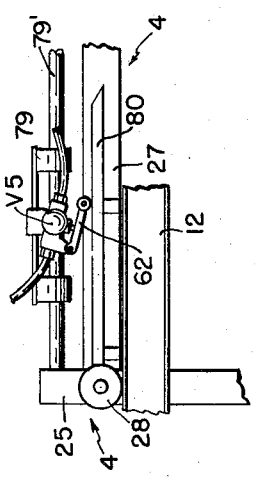
Figure 8 is a fragmentary detail view of the pusher operated valve which causes the air controlled bag clamp and funnel to release at the proper point in the operating cycle.
Figure 12:
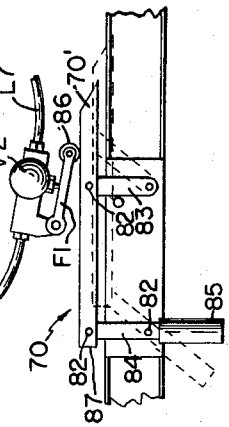
Figure 12 is a detail side elevational view of the carriage operated valve which energizes the pusher assembly of this invention.

The travelling carriage 4 includes spaced vertical members 25 and 26 and spaced horizontal members 27 connecting the vertical members, and containing rollers 28 which are supported by members 25 and 26 and ride on horizontal members 12 and 13 of the main frame 3. At the discharge end of carriage 4, the vertical members 25 support a funnel and clamp assembly 6 including a funnel assembly 6' and a bag clamp sub-assembly 29. The funnel assembly 6' is best seen in Figure 5 and it includes a box frame 30 which rides in parallel guides 31 attached to carriage supports 25. A brace 32 connects parallel supports 25 of frame 3 and supports the rear side of box frame 30 for guided vertical movement. A cylinder C3 is mounted on brace 32 with its piston 33 connected to the lower section of frame 30 so that extension of piston 33 will force frame 30 downward and separate lower funnel jaw 24 from stationary upper jaw 23. This movement of the jaws provides a funnel for insertion into the open mouth of an empty overslip 34 for holding same in place in a fully open condition. The parallel movement of jaw 24 and the parallel movement and flat engagement of clamp roller 35 will insure the maximum safe spread and grip on overslip bag 34. The upper jaw 23 is rigid and fastened to cross member 36 which connects vertical supports 25. A skate wheel platform 37 (Figure 4) is attached to and rides with carriage 4, and an extension skate wheel platform 38 is attached to end support 25 of the carriage and extends considerably beyond the carriage on the downstream side. A roller and bracket assembly 39 attached to center support 11 will support platform 38 and permit it to travel with carriage 4.

The discharge end mechanism 7 includes a pair of spaced pulleys 40 and 41 on each top beam 14 and these pulleys are connected by multiple belts 42. Each pulley 40 is power driven by shaft 43 or 44 which is rigidly fastened to drive wheels 45 and 46 respectively. An electric motor 47 drives a right angle reduction gear box 48 whose output shaft 44 directly drives one pulley 40. Wheel 46 is also directly driven by shaft 44 and this wheel by means of crossed over V-belt 49 drives wheel 45 in the opposite direction so that shaft 43 and pulley 40' rotate contra to pulley 40. Both pulleys 40 and 40' rotate in such a direction as to cause their belts 42 to move toward the discharge end and carry any superimposed packages 8 to be deposited on conveyor 9.

The bag ender mechanism of the discharge mechanism 7 is shown in detail in Figures 9–11 to include a vertical gear shaft 50 including a bevel gear 51 and being rigidly supported by upper and lower beams 16 and 17 of the main frame 3. A swing frame 52 is journalled to shaft 50 at spaced bearing blocks 53 and 54 so that a force applied to top frame member 55 by piston 56 of cylinder C6 will cause frame 52 to rotate about shaft 50 as a pivot. Member 55 supports a second vertically extending horizontal bore bearing block 57 which together with right angle bearing block 53 rotatably supports a shaft 58 to which is attached a bag holding frame 59 and to which shaft a bevel pinion 60 is attached at a location to mesh with gear 51. In Figure 10, cylinder C6 is seen to be pivoted to one cross member 19 of main frame 3 by means of a bracket and pin connection 60 and piston 56 is pivoted to member 55 by bracket and pin 61. The construction of bag holding frame 59 is U-shaped to permit it to be rotated with shaft 58 until a bag 8 thereon stands in a vertical position, and guard lip 62 is slightly below the bottom of bag 8. The ratio between the gear teeth of the pinion 60 and bevel gear 51 is roughly two-to-one so that while frame 52 is rotating 45° to its location, the bag 8 and its frame 59 will rotate 90° so that the bag will be upright. The conveyor 9 is positioned to receive the upright bag 8; and its belt 63 is mounted over rollers 64 in such a manner that a depression is formed in the belt 63 at a point opposite lip 62. Figure 11 shows this in detail and also the belt tensioning mechanism which comprises threaded bracket 65 of bottom roller 64 and adjustment screw 66 which tightens against stop 67 to move bracket 65 downward in slot 68 and consequently apply tension to belt 63. It will be observed in Figure 11 that bag 8 when fully bottomed will rest on the top surface of conveyor belt 63 and when the belt is power driven, the bag 8 will move along with the belt since lip 62 is out of the way.

Figure 13:
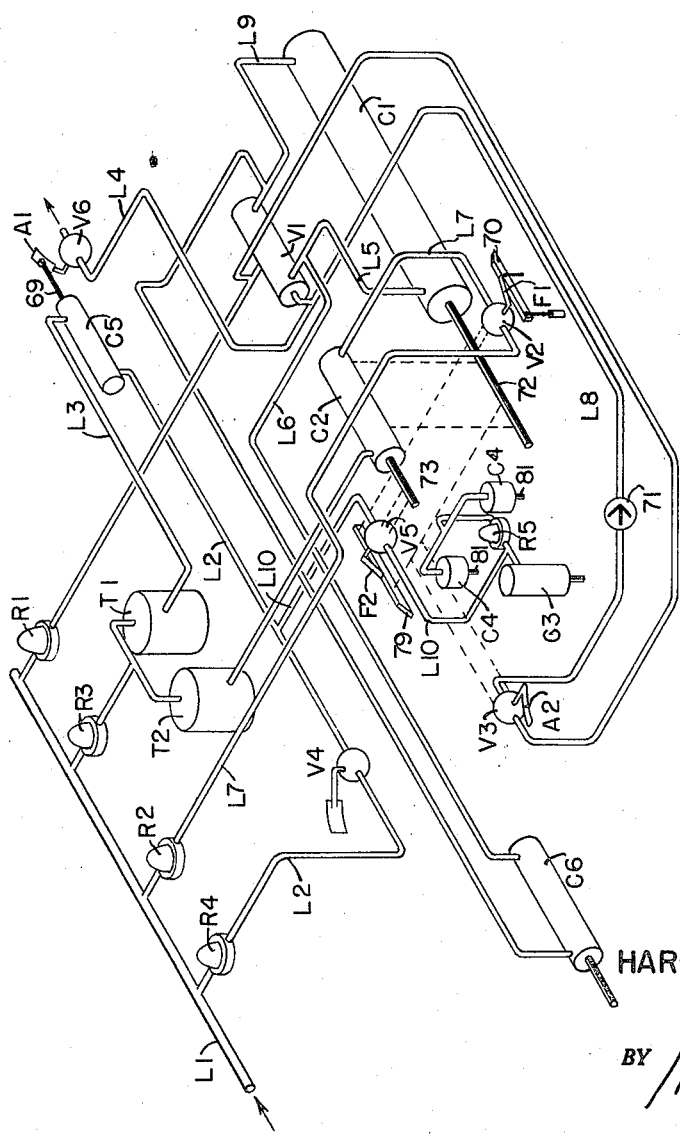
Figure 13 is a schematic drawing showing the hydraulic system of this invention.

The overall schematic diagram of Figure 13 shows the operation of the hydraulic system of this invention, and the operating cycle together with a more detailed description of some of the smaller mechanisms may be had by reference to Figure 13 taken along with reference to the remaining views:

As the operator steps up to the machine 2 to insert an empty overslip bag 34 onto funnel assembly 6', he depresses a normally open hip operated valve V4 which shuts off the fluid supply from the main supply line L1 through regulator R4, line L2 and cylinder C5 which is the cycle starter cylinder. The piston of this cylinder is normally retracted due to the static low pressure in the line L3 from low pressure reservoir tank T1, which is controlled by regulator R3 and valve V6 is normally closed. When the operator steps away from hip valve V4 fluid is applied as above through line L2 to cylinder C5, thus starting the cycle, and the piston 69 of cylinder C5 depresses lever arm A1 and direct fluid through line L4 and into pilot valve V1 (Schrader No. 3322P commercial valve) which then directs fluid through line L5 to the retraction side of main carriage travel cylinder C1 and simultaneously through line L6 to bag ender cylinder C6 to be discharging one bag while processing another from conveyor rack 20. As carriage 4 is thus moving toward conveyor rack 20 the pusher arm 70 is above the carriage as in Figure 6 and out of the way of any bags 21. As the funnel assembly 6' of carriage 4 meets an oncoming bag 21, the bag passes through the open jaws 23 and 24 and substantially into overslip 34 to a point shown in Figure 3 where it trips lever arm A2 and opens the normally closed valve V3 to direct fluid through check valve 71 and line L8 into pilot valve V1 to close off the fluid supply through line L5 whereby pressurized fluid is then diverted through line L9 to extend piston 72 and cause carriage 4 to move downstream at a faster rate than the oncoming bags 21. Normally closed valve V2 is supported from member 27 on one side by bracket 27'. Discharge movement of carriage 4 causes follower arm F1 of pusher cylinder valve V2 to ride up onto track 70 and open the valve V2 to direct pressurized fluid through line L7 to cylinder C2 to extend the piston 73 which automatically causes pusher arms 74 to pivot downward about pin 75 as soon as the rear section 76 of arm 74 has moved away from stop 77. This downward movement of arms 74 locates transverse pusher plate 78 approximately centrally of package 21 and further movement of piston 73 causes the bag 21 to move into the open mouth overslip 34 until package 21 reaches and depresses lever arm A2 of normally closed valve V3 as previously described to reverse the carriage 4. However, just prior to this reversal, follower arm F2 of normally closed valve V5, which is attached to and travels with pusher arm support 79 along guide rod 79' has been riding on carriage mounted track 80 and suddenly drops off track 80 to open valve V5 and shut off the fluid supply from line L2 through lines L10 into funnel operating cylinder C3 and also through regulator R5 and into clamping assembly cylinders C4 whereby the cylinders become inoperative and internal springs in cylinders C4 raise pistons 81 and consequently clamp roller 35; at the same time external spring 82 retracts piston 33 and raises frame 30 to collapse lower jaw 24 of funnel assembly 6. With the funnel thus collapsed, additional movement of piston 73 will cause pusher arms 74 to first bottom bag 21 in overslip bag 34 and then push the assembled bag 8 into the grip of moving belts 42 to then be discharged as previously described. Just prior to being fully bottomed in overslip 34, the filled package 21 reaches a position to operate arm A2 of valve V3 which actuates cylinder C1 in reverse as already described to send carriage 4 away from the approaching packages and to a position of rest at its overslip loading position, and due to the hinged connections 88 by which track 70' of track assembly 70 is supported from vertical links 83 and 84, the top bevelled track 70' will remain firm with rigid frame member 12 when carriage 4 is moving toward discharge end of the assembly, but the track 70' will recede when carriage 4 is moving upstream. The heavy handle 85 will cause track 70' to return to its normal fixed position when the follower F1 has moved beyond the bevelled end of track 70'. The action of roller 86 on the flat end 87 of the track 70' when the carriage is moving toward oncoming packages 21 causes the pivoted track assembly 70 to collapse and permit follower arm F1 to expand and permit valve V2 to close, which action allows the low pressure from line L11 to enter cylinder C2 and thus retract piston 73 and pusher arms 74 sooner (due to the collapse) than would be possible with a rigid track assembly.

Summarizing the above described operation, the operator places an empty overslip bag 34 over the funnel assembly 6' on the travelling carriage 4 and then steps back releasing the hip valve V4 which places the operating cycle in motion. The carriage carrying the empty overslip moves toward the approaching filled bags or packages 21. When the lead package 21 meets the oncoming carriage, package 21 passes into overslip 34 until it meets and trips lever A2 to actuate valve V3 and extend carriage cylinder C1 at a faster rate of speed than the approaching packages 21 to thus provide a gap in which pusher 5 may operate to pack and discharge the now filled bag 8 at the proper point in the cycle. The bags 8 are passed onto tilting frame 59 which rotates and tilts to place the now upright bag 8 on to the conventional sealing machine 10 to complete the desired operation of the machine of this invention which is to automatically place a filled package within an overslip bag in a rapid and efficient manner and with a minimum of supervision.

The invention is not limited to the exemplary construction herein shown and described but may be made in various ways within the scope of the appended claims.

What is claimed is:

1. An overslipping machine comprising: a frame, a travelling carriage on said frame, a conveyor in alignment with said frame and adapted to move packages thereon, means to hold an empty overslip on said carriage to travel therewith, the end of said overslip facing said oncoming packages being open to receive one of said packages, means moving said carriage toward said packages until said one package is substantially within said overslip and then to rapidly reverse the travel of said carriage, and additional means packing said package into said overslip.

2. An overslipping machine comprising: a frame, a conveyor in alignment with said frame, said conveyor supporting bags moving into said frame, means to move an empty overslip toward and partially over the first said bag, means to retract said overslip and partially inserted bag at a faster speed than the movement of said bags on said conveyor to provide a gap between said first bag and the balance of said bags, and means in said gap for packing said bag in said overslip to form a double bag.

3. A method of inserting a filled package from a conveyor line containing multiple packages into an empty overslip without changing the line of travel of said packages, comprising placing an empty overslip on an overslipping machine and moving said overslip with one end open toward the advancing line of packages until the first package is partially inserted therein and then automatically and rapidly moving said overslip and package away from said line to leave a gap therein, and inserting packing means in said gap to pack and discharge the overslip and package.

4. A method of inserting a filled package from a moving conveyor line containing multiple packages into an empty overslip without changing the line of travel or the speed of the balance of said multiple packages, comprising gripping an empty overslip bag on an overslipping machine and moving said overslip bag with one end open toward the advancing line of packages until the first package is partially inserted therein and then automatically and rapidly moving said overslip bag and package away from said line to leave a gap therein, and inserting means in said gap to pack said package into said overslip bag, and automatically releasing the grip on said overslip to discharge the combined package and bag from said machine in an upright position.

5. An overslipping machine, comprising: a frame having a conveyor containing multiple packages in line therewith, a travelling carriage on said frame, means on said carriage to grip an empty overslip, power means to move said carriage and overslip toward said conveyor until said overslip engulfs the first of said multiple packages, means automatically retracting said carriage at a faster speed than said conveyor movement and thereby leaving a gap between said first partially overslipped package and the next subsequent package in the said conveyor line, pusher means operative in said gap packing said first package into said overslip and means operative by said carriage movement releasing the grip on said overslip and permitting said package and overslip to be discharged, and power means retracting said pusher means out of said gap.

6. An overslipping machine comprising: a frame being in line with a multiple package conveyor, a travelling carriage on said frame, a skate wheel platform on and travelling with said carriage, means on said carriage to grip an empty overslip, power means automatically moving said carriage toward said conveyor until said overslip partially contains the first of said packages, means automatically retracting said carriage and partially contained package at a faster speed than said conveyor movement and thereby leaving a gap between the first partially contained package and the balance of said packages, pusher means operative in said gap packing said first package into said overslip and means operative by said carriage movement releasing the grip on said overslip and permitting said pusher means to discharge said first package and overslip onto said skate wheel platform.

7. In an overslipping machine, a frame in line with a multiple package conveyor, a travelling carriage on said frame, a funnel assembly on said carriage for gripping an empty overslip, parallel jaws on said funnel assembly adapted to insert in the open end of an empty overslip, automatic means in said funnel assembly expanding said jaws engaging the inner surface of said overslip, and additional means gripping and holding the outer surface of said overslip against at least one of said jaws while said carriage travels toward said multiple packages.

8. In an overslipping machine, a frame in line with a multiple package conveyor, a travelling carriage on said frame, a funnel assembly on said carriage for gripping an empty overslip, parallel jaws on said funnel assembly adapted to insert in the open end of an empty overslip, means in said funnel assembly to expand said jaws to engage the inner surface of said overslip, means for gripping and holding the outer surface of said overslip against at least one of said jaws, and power means to move said carriage toward said multiple packages, and control means to cause said power means to move said carriage away from said multiple packages when the first said package has entered said overslip to a predetermined distance.

9. A method of placing an empty overslip on a filled package in a multiple package conveyor line comprising: moving the open end of an overslip toward the first package of oncoming packages of a conveyor line moving at a steady speed, and allowing the first package to partially fill the overslip, and then moving the combined overslip and package away from the conveyor line at a faster speed than the said steady speed, said overslip and said packages maintaining a horizontal position throughout.

10. A method of placing an empty overslip on a filled package in a steady moving multiple package conveyor line comprising: power moving an empty overslip toward the oncoming packages with the open end of the overslip facing the end of the first package, and stopping the overslip movement to allow the movement of the conveyor line to force the first package partially into the overslip, and then moving the combined overslip and package away from the conveyor line with a faster movement than said conveyor line movement to provide a substantial gap between the first package and the balance of the packages and then placing means in said gap to fully seat said first package in said overslip, and then repeating said process before the next subsequent package has travelled beyond the point at which the first named package had entered the first empty overslip.

No references cited.